United States Patent
Munro et al.

(10) Patent No.: US 9,840,604 B2
(45) Date of Patent: *Dec. 12, 2017

(54) FOAM COMPOSITION WITH OLEFIN BLOCK COPOLYMER GEL PARTICLES

(71) Applicant: Dow Global Technologies LLC, Midland, MI (US)

(72) Inventors: Jeffrey C. Munro, Houston, TX (US); Kaoru Aou, Lake Jackson, TX (US); Raymond L. Laakso, Jr., St. Francisville, LA (US); Gary R. Marchand, Gonzales, LA (US); Rogelio R. Gamboa, Brazoria, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/289,370

(22) Filed: Oct. 10, 2016

(65) Prior Publication Data

US 2017/0029588 A1 Feb. 2, 2017

Related U.S. Application Data

(63) Continuation of application No. 14/364,497, filed as application No. PCT/US2012/067686 on Dec. 4, 2012, now Pat. No. 9,464,177.

(60) Provisional application No. 61/581,771, filed on Dec. 30, 2011.

(51) Int. Cl.
*C08J 9/00* (2006.01)
*C08L 53/00* (2006.01)
*C08L 75/04* (2006.01)

(52) U.S. Cl.
CPC ........... *C08J 9/0061* (2013.01); *C08J 9/0095* (2013.01); *C08L 53/00* (2013.01); *C08L 75/04* (2013.01); *C08J 2205/02* (2013.01); *C08J 2321/02* (2013.01); *C08J 2325/06* (2013.01); *C08J 2363/00* (2013.01); *C08J 2375/04* (2013.01); *C08J 2453/00* (2013.01); *C08J 2491/02* (2013.01)

(58) Field of Classification Search
CPC .... C08J 9/0095; C08J 9/0061; C08J 2363/00; C08J 2453/00; C08J 2375/04; C08J 2321/02; C08J 2491/02; C08J 2205/02; C08J 2325/06; C08L 53/00
See application file for complete search history.

(56) References Cited

U.S. PATENT DOCUMENTS

| | | | |
|---|---|---|---|
| 4,798,081 A | 1/1989 | Hazlitt et al. | |
| 6,498,198 B2 | 12/2002 | Pearce | |
| 7,557,147 B2 | 7/2009 | Martinez et al. | |
| 7,608,668 B2 | 10/2009 | Li Pi Shan et al. | |
| 7,858,706 B2 | 12/2010 | Arriola et al. | |
| 8,933,139 B1 | 1/2015 | Peterson et al. | |
| 8,933,140 B2 * | 1/2015 | Peterson | C08J 9/0009 521/134 |
| 9,464,177 B2 * | 10/2016 | Munro | C08J 9/0061 |
| 2003/0098598 A1 | 5/2003 | English et al. | |
| 2005/0043425 A1 | 2/2005 | Beck et al. | |
| 2007/0054972 A1 | 3/2007 | Braun et al. | |
| 2007/0112127 A1 | 5/2007 | Soediono et al. | |
| 2009/0142551 A1 | 6/2009 | Fox et al. | |
| 2009/0292037 A1 | 11/2009 | Butler et al. | |
| 2010/0010154 A1 | 1/2010 | St. Clair | |
| 2011/0201709 A1 | 8/2011 | Athey et al. | |
| 2011/0306715 A1 | 12/2011 | Batra et al. | |
| 2015/0259524 A1 | 9/2015 | Batra et al. | |

FOREIGN PATENT DOCUMENTS

| | | |
|---|---|---|
| EP | 2336223 A1 | 6/2011 |
| WO | 2005/090427 A1 | 9/2005 |
| WO | 2009/070801 A1 | 6/2009 |
| WO | WO 2011/008845 * | 1/2011 |

OTHER PUBLICATIONS

Dobymin, J. Chem. Phys. 107(21), Dec. 1997, p. 9234-9238.
Potemkin et al., Physical Review E, 57(6), Jun. 1998, p. 6902-6912.
Randall, JMW-Rev. Macromol. Chem. Phys., C29(2&3), 1989, p. 201-317.
Wild, et al., J. Polym. Sci., vol. 20, 1982, p. 441-455.
Williams et al., J. Polym. Sci., Polym. Let., vol. 6, 1968, p. 621-624.

* cited by examiner

*Primary Examiner* — John Cooney
(74) *Attorney, Agent, or Firm* — Husch Blackwell LLP

(57) ABSTRACT

The present disclosure is directed to a composition and articles containing the composition. The composition comprises a foam and a plurality of gel particles dispersed in the foam. The gel particles comprise an olefin block copolymer and an oil.

10 Claims, No Drawings

FOAM COMPOSITION WITH OLEFIN BLOCK COPOLYMER GEL PARTICLES

FIELD

The present disclosure is directed to compositions composed of foam with gel particles dispersed therein and articles containing same.

BACKGROUND

Known are composite materials composed of foam with gel particles dispersed therein. Such composite foam/gel materials provide additional support when used as a mattress topper, for example. Hence, the art recognizes the need for new composite foam/gel particle materials that provide properties such as comfort, support, durability, and resiliency.

SUMMARY

The present disclosure is directed to compositions composed of foam with gel particles and articles containing same.

In an embodiment, the composition comprises a foam and a plurality of gel particles dispersed in the foam. The gel particles comprise an olefin block copolymer and an oil.

The present disclosure provides an article. In an embodiment, the article comprises a composition comprising a foam and a plurality of gel particles dispersed in the foam. The gel particles comprise an olefin block copolymer and an oil.

DETAILED DESCRIPTION

1. Composition

The present disclosure provides a composition. The composition is composed of a foam and a plurality of gel particles. The gel particles are dispersed in the foam. In other words, the foam is a continuous phase and the gel particles are a discontinuous phase dispersed throughout the foam continuous phase. In an embodiment, the gel particles are homogeneously dispersed throughout the foam.

A. Foam

The present composition includes a foam. A "foam," as used herein, is a dispersion of gaseous voids in a solid. The foam can be an open cell foam or a closed cell foam. The foam can be a rigid foam or a flexible foam. The foam can be a polyurethane (polyester or polyether) foam, a latex foam, a polystyrene foam, an epoxy foam, a polyvinyl foam, and combinations thereof. The foam can include any combination of the foregoing properties and/or compositions.

In an embodiment, the foam is a polyurethane (PU) foam that is the reaction product of a polyol component with a polyisocyanate in the presence of a blowing agent.

In an embodiment the foam is a viscoelastic foam. A "viscoelastic foam" (or "VE foam") is a foam having a resilience of less than 25%, as measured according to ASTM D3574 Test H. A viscoelastic foam exhibits a time-delayed and rate-dependent response to an applied stress. Viscoelastic foam has low resiliency and recovers slowly when compressed. These properties are often associated with the glass transition temperature (Tg) of the polyurethane. Viscoelasticity is often manifested when the polymer has a Tg at or near the use temperature, which is room temperature for many applications.

In an embodiment, the foam is a VE polyurethane foam. VE polyurethane foam is typically prepared by the reaction of a polyol component with a polyisocyanate, in the presence of a blowing agent. The blowing agent is usually water or, a mixture of water and another material. VE polyurethane foam is often characterized by the selection of polyol component and the amount of water in the formulation. The predominant polyol used in VE polyurethane foam has a functionality of about 3 hydroxyl groups/molecule and a molecular weight in the range of 400-1500. This polyol is primarily the principal determinant of the Tg of the VE polyurethane foam, although other factors such as water levels and isocyanate index also play significant roles.

Water levels in VE polyurethane foams are typically no greater than 2.5 parts per 100 parts by weight of the polyol(s), and most often are in the 0.8-1.5 parts range. This is lower than the water levels that are typically used in flexible foam formulations, in which the water level is typically in the 4 to 6 part range (per 100 parts by weight polyol). The lower water level favors the development of the desired viscoelastic properties in the foam, in part due to a phenomenon sometimes referred to as "phase mixing". The lower amount of water produces less blowing gas, and so VE foams tend to have higher densities (about 3.5-6 pound per cubic foot (pcf) or higher) than most flexible foams (which tend to have densities in the 1-2.5 pcf range). The higher density is desirable in many applications, such as mattresses, where it contributes to the durability of the product and its ability to support applied loads.

In an embodiment, the foam is a VE polyurethane foam with a resilience of less than 25%, or less than 15%, or less than 10%.

B. Gel Particles

The composition also includes gel particles dispersed in the foam. In an embodiment, the composition includes from 10 wt %, or 20 wt % to 30 wt %, or 40 wt % gel particles and from 90 wt %, or 80 wt % to 70 wt % or 60 wt % foam. Weight percent is based on the total weight of the composition.

The gel particles include an olefin block copolymer and an oil. An "olefin block copolymer" (or "OBC"), as used herein, is a multi-block or segmented copolymer and includes two or more chemically distinct regions or segments (referred to as "blocks") joined in a linear manner, that is, a polymer comprising chemically differentiated units which are joined end-to-end with respect to polymerized ethylenic functionality, rather than in pendent or grafted fashion. In certain embodiments, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The olefin block copolymer is characterized by unique distributions of polydispersity index (PDI or $M_w/M_n$), block length distribution, and/or block number distribution due to the unique process making of the copolymers. More specifically, when produced in a continuous process, embodiments of the OBC may possess a PDI ranging from 1.7 to 8; or from 1.7 to 3.5; or from 1.7 to 2.5; and from 1.8 to 2.5; or from 1.8 to 2.1. When produced in a batch or semi-batch process, embodiments of the OBC may possess a PDI ranging from 1.0 to 2.9; or from 1.3 to 2.5; or from 1.4 to 2.0; or from 1.4 to 1.8.

In an embodiment, the OBC is an ethylene/α-olefin multi-block copolymer. The ethylene/α-olefin multi-block copolymer comprises a majority mole fraction of units derived from ethylene, the ethylene comprising at least 50 mol %, or at least 60 mol %, or at least 70 mol %, or at least 80 mol % with the remainder of the multi-block copolymer comprising the comonomer. The ethylene/α-olefin multi-block copolymer further includes ethylene and the co-polymerizable α-olefin comonomer in polymerized form, characterized by multiple (i.e., two or more) blocks or segments of two or more polymerized monomer units differing in chemical or physical properties (block interpolymer), and is a multi-block copolymer. In some embodiments, the multi-block copolymer may be represented by the following formula:

(AB)$_n$ where n is at least 1, preferably an integer greater than 1, such as 2, 3, 4, 5, 10, 15, 20, 30, 40, 50, 60, 70, 80, 90, 100, or higher; "A" represents a hard block or segment; and "B" represents a soft block or segment. The A's and B's are linked in a linear fashion, not in a branched or a star fashion. "Hard" segments refer to blocks of polymerized units in which ethylene is present in an amount greater than 95 weight percent in some embodiments, and in other embodiments greater than 98 weight percent. In other words, the comonomer content in the hard segments is less than 5 weight percent in some embodiments, and in other embodiments, less than 2 weight percent of the total weight of the hard segments. In some embodiments, the hard segments comprise all, or substantially all, ethylene.

The "soft" segments, on the other hand, refer to blocks of polymerized units in which the comonomer content is greater than 5 weight percent of the total weight of the soft segments in some embodiments, greater than 8 weight percent, greater than 10 weight percent, or greater than 15 weight percent in various other embodiments. In some embodiments, the comonomer content in the soft segments may be greater than 20 weight percent, greater than 25 eight percent, greater than 30 weight percent, greater than 35 weight percent, greater than 40 weight percent, greater than 45 weight percent, greater than 50 weight percent, or greater than 60 weight percent in various other embodiments.

Because the respective distinguishable segments or blocks formed from two or more monomers are joined into single polymer chains, the polymer cannot be completely fractionated using standard selective extraction techniques. For example, polymers containing regions that are relatively crystalline (high density segments) and regions that are relatively amorphous (lower density segments) cannot be selectively extracted or fractionated using differing solvents. In an embodiment, the quantity of extractable polymer using either a dialkyl ether or an alkane solvent is less than 10, or less than 7, or less than 5, or less than 2, percent of the total polymer weight.

In addition, the OBC disclosed herein possesses a PDI fitting a Schultz-Flory distribution rather than a Poisson distribution. The present OBC is produced by the polymerization process described in U.S. Pat. No. 7,858,706 and U.S. Pat. No. 7,608,668 which results in a product having both a polydisperse block distribution as well as a polydisperse distribution of block sizes. This results in the formation of OBC product having distinguishable physical properties. The theoretical benefits of a polydisperse block distribution have been previously modeled and discussed in Potemkin, *Physical Review E* (1998) 57 (6), pp. 6902-6912, and Dobrynin, *J. Chem.Phys.* (1997) 107 (21), pp 9234-9238.

In an embodiment, the ethylene/α-olefin multi-block copolymer is defined as having (A) Mw/Mn from 1.7 to 3.5, at least one melting point, Tm, in degrees Celsius, and a density, d, in grams/cubic centimeter, where in the numerical values of Tm and d correspond to the relationship:

$Tm>-2002.9+4538.5(d)-2422.2(d)^2$.

In an embodiment, the ethylene/α-olefin multi-block copolymer is defined as having (B) Mw/Mn from 1.7 to 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

ΔT>-0.1299(ΔH)+62.81 for ΔH greater than zero and up to 130 J/g

ΔT≥48° C. for ΔH greater than 130 J/g wherein the CRYSTAF peak is determined using at least 5 percent of the cumulative polymer, and if less than 5 percent of the polymer has an identifiable CRYSTAF peak, then the CRYSTAF temperature is 30° C.

In an embodiment, the ethylene/α-olefin multi-block copolymer is defined as having (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

Re>1481-1629(d).

In an embodiment, the ethylene/α-olefin multi-block copolymer is defined as having (D) a molecular weight fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer.

In an embodiment, the ethylene/α-olefin multi-block copolymer is defined as having (E) a storage modulus at 25° C., G'(25° C.), and a storage modulus at 100° C., G'(100° C.), wherein the ratio of G'(25° C.) to G' (100° C.) is in the range of about 1:1 to about 9:1.

In an embodiment, the ethylene/α-olefin multi-block copolymer is defined as having (F) a molecular fraction which elutes between 40° C. and 130° C. when fractionated using TREF, characterized in that the fraction has a block index of at least 0.5 and up to about 1 and a molecular weight distribution, Mw/Mn, greater than about 1.3.

In an embodiment, the ethylene/α-olefin multi-block copolymer is defined as having (G) average block index greater than zero and up to about 1.0 and a molecular weight distribution, Mw/Mn greater than about 1.3.

The ethylene/α-olefin multi-block copolymer may have any combination of properties (A)-(G) set forth above.

Nonlimiting examples of suitable comonomer include straight-chain/branched α-olefin of 3 to 30 carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, or 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

In an embodiment, the comonomer in the ethylene/α-olefin multi-block copolymer is selected from propylene, octene, butene and hexene.

In an embodiment, the ethylene/α-olefin multi-block interpolymer is an ethylene/octene multi-block copolymer.

C. Oil

The gel particles are composed of the OBC and an oil. The oil is absorbed into the OBC resin. The OBC resin retains the absorbed oil. The oil is selected from an aromatic oil, a naphthenic oil, a paraffinic oil, a mineral oil, and combinations thereof.

In an embodiment, the gel particles are formed by imbibing OBC pellets with oil in an extruder at a temperature from 130° C. to 270° C. The OBC/oil composition is subsequently cryogenically ground to form gel particles with a D50 particle size from 50 microns to 1500 microns. As used herein "D50" is the particle distribution such that 50% of the sample particle volume is above the stated average particle size range.

In an embodiment, the gel particles are formed by micropelletizing or grinding OBC pellets to a D50 particle size from 50 microns to 1500 microns. The OBC particles are subsequently imbibed with the oil at a temperature from 15° C. to 100° C. In an embodiment, the gel particles contain from 30 wt % to 70 wt % OBC and from 70 wt % to 30 wt % oil.

In an embodiment, the present gel particles are composed of from 30 wt % to 70 wt % of ethylene/octene multi-block copolymer and (ii) from 70 wt % to 30 wt % of the oil. The soft segment of the ethylene/octene multi-block copolymer includes from 10 mol %, or 15 mol % to 20 mol %, or 26 mol %, or 30 mol %, or 35 mol % units derived from octene. The ethylene/octene multi-block copolymer has from 70 mol %, or 78 mol % to 90 mol % total ethylene (based on total weight of the ethylene/octene multi-block copolymer). The ethylene/octene multi-block copolymer has a density from 0.866 g/cc to 0.887 g/cc. The ethylene/octene multi-block copolymer has a melt index (MI) from 0.5 g/10 min to 5.0 g/10 min. The gel particles have a D50 particle size from 50 microns, or 100 microns, or 200 microns, or 300 microns to 500 microns, or 1000 microns, or 1500 microns.

Ethylene/octene multi-block copolymer having a soft segment with from 10 mol % to 35 mol % units derived from octene and a total ethylene content (i.e., units derived from ethylene) from 70 mol %, or 75 mol %, or 78 mol % to 90 mol % produces gel particles with (i) softness, (ii) higher melting point, and (iii) improved handling properties (no agglomeration) when compared to gel particles composed of oil and styrenic block polymer, for example.

In an embodiment, the gel particles are styrene-free.

In an embodiment, the present composition has a support factor from 2.0 or greater than 2.0 to 3.5.

In an embodiment, the present composition has a support factor that is at least 0.2 points greater than a comparable composition (i.e., the same foam and the same optional additives) and without gel particles.

In an embodiment, the composition includes 85 to 95 wt % of VE polyurethane foam and 15 to 5 wt % gel particles based on total weight of the composition. The gel particles contain 50 to 70 wt % OBC and 50 to 30 wt % oil based on total weight of the gel particles. The OBC is an ethylene/octene multi-block copolymer with 60 to 90 wt % soft segment (based on total weight of the OBC) and 15 to 20 mol % units derived from octene in the soft segment. The composition has a support factor of greater than 2.0 to 3.5.

Any of the foregoing gel particles may include one or more of the following optional additives. Nonlimiting examples of suitable additives for the gel particles include filler (calcium carbonate, clay, talc, silica, zinc oxide, titanium dioxide), a second polyolefin (polyethylene, polypropylene), antioxidant, stabilizer, anti-blocking agent, lubricant, and any combination of the foregoing.

The composition (composite of the foam and gel particles) may include one or more of the following optional additives: slip agents, anti-blocking agents, plasticizers, antioxidants, UV stabilizers, colorants or pigments, fillers, lubricants, antifogging agents, flow aids, coupling agents, cross-linking agents, nucleating agents, surfactants, solvents, flame retardants, antistatic agents, active agents, and combinations thereof. The active agent can be an antimicrobial agent, an antifungal agent, and/or an antibacterial agent, and any combination thereof. Nonlimiting examples of suitable active agents include tolnaftate, undecenoic acid, allylamines, chlorine, copper, baking soda, sodium omadine, zinc omadine, azoles, silver and any combination of the foregoing. The active agent can be applied to minimize or prevent the formation of fungus, bacteria and/or parasites in or on the composition.

The present composition may comprise two or more embodiments disclosed herein.

2. Article

The present disclosure provides an article. The article includes the composition composed of (i) foam and (ii) the gel particles dispersed in the foam. The foam may be any foam disclosed herein. The gel particles may be any OBC/oil gel particles disclosed herein.

Nonlimiting examples of suitable articles include padding for medical devices and equipment (e.g., wheelchair seat pads, wheelchair padding, medical pads, hospital gurney pads, operating table pads, positioning pads); padding for furniture (e.g., upholstery padding, furniture cushions, furniture pads); padding for athletic equipment and devices (e.g., athletic cushions, sports and athletic padding, gymnastic mats, helmet liners); padding for recreational equipment and devices (e.g., bumper pads and camping and sleeping mats); padding for apparel (e.g., bra straps, shoulder pads, shoe linings, boot linings); padding for household goods (e.g., anti-fatigue mats, mattress pads, mattress covers, mattress "toppers," the pillow-top portion of pillow-top mattresses, pillows, and the like); padding accessories (e.g., briefcase shoulder straps, computer carrying cases, purses, gloves, and the like); ear plugs; pet beds; packaging padding; cushioning applications; noise and vibration dampening applications; and any combination of the foregoing.

In an embodiment, the composition is a component of a mattress topper.

The present article may comprise two or more embodiments disclosed herein.

Definitions

The terms "comprising", "including", "having" and their derivatives do not exclude the presence of any additional component or procedure. The term, "consisting essentially of" excludes any other component or procedure, except those essential to operability. The term "consisting of" excludes any component or procedure not specifically stated.

"Compression set" is a measure of how well a foam is able to recover to its original dimensions after being compressed for an extended period of time. Compression set measures the permanent deformation of a foam after it has been held compressed under controlled time and temperature conditions. Compression set is generally used to correlate in-service loss of cushion thickness and changes in foam hardness.

Test Methods

The test methods are provided as (1) Polymer Test Methods and (2) Foam Test Methods.

1. Polymer Test Methods

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; Determination of Branching Distributions in Polyethylene and Ethylene Copolymers, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3 g of a 50/50 mixture of tetrachloroethane-d$^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989).

Compression Set

Compression set for OBC is measured according to ASTM D 395. The sample is prepared by stacking 25.4 mm diameter round discs of 3.2 mm, 2.0 mm, and 0.25 mm thickness until a total thickness of 12.7 mm is reached. The discs are cut from 12.7 cm×12.7 cm compression molded plaques molded with a hot press under the following conditions: zero pressure for 3 min at 190° C., followed by 86 MPa for 2 min at 190° C., followed by cooling inside the press with cold running water at 86 MPa.

CRYSTAF Standard Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

Density—Polymer samples for density measurement are prepared according to ASTM D 1928. Measurements are made within one hour of sample pressing using ASTM D 792, Method B.

DSC Standard Method

Differential Scanning Calorimetry (DSC) results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

DMA

Dynamic Mechanical Analysis (DMA) is measured on compression molded disks formed in a hot press at 180° C. at 10 MPa pressure for 5 minutes and then water cooled in the press at 90° C./min. Testing is conducted using an ARES controlled strain rheometer (TA instruments) equipped with dual cantilever fixtures for torsion testing.

A 1.5 mm plaque is pressed and cut in a bar of dimensions 32×12 mm. The sample is clamped at both ends between fixtures separated by 10 mm (grip separation ΔL) and subjected to successive temperature steps from −100° C. to 200° C. (5° C. per step). At each temperature the torsion modulus G' is measured at an angular frequency of 10 rad/s, the strain amplitude being maintained between 0.1 percent and 4 percent to ensure that the torque is sufficient and that the measurement remains in the linear regime.

An initial static force of 10 g is maintained (auto-tension mode) to prevent slack in the sample when thermal expansion occurs. As a consequence, the grip separation ΔL increases with the temperature, particularly above the melting or softening point of the polymer sample. The test stops at the maximum temperature or when the gap between the fixtures reaches 65 mm.

GPC Method

The gel permeation chromatographic (GPC) system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polym. Sci., Polym. Let., 6, 621 (1968)): $M_{polyethylene}=0.431(M_{polystyrene})$.

Polyethylene equivalent molecular weight calculations are performed using Viscotek TriSEC software Version 3.0.

Measurement of Weight Percent of Hard Segment and Soft Segment—the soft segment weight percentage (and thus the hard segment weight percentage) can be measured by DSC or NMR as disclosed in U.S. Pat. No. 7,608,668 col. 57 line 30 through col. 63 line 12.

Melt flow rate, or MFR is measured in accordance with ASTM D 1238, Condition 230° C./2.16 kg.

Melt index, or MI, is measured in accordance with ASTM D 1238, Condition 190° C./2.16 kg.

Polymer Fractionation by TREF

Large-scale TREF fractionation is carried by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm×12 cm) steel column packed with a 60:40 (v:v) mix of 30-40 mesh (600-425 μm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63 Industrial Drive, North Tonawanda, N.Y., 14120). The column is immersed in a thermally controlled oil jacket, set initially to 160° C. The column is first cooled ballistically to 125° C., then slow cooled to 20° C. at 0.04° C. per minute and held for one hour. Fresh TCB is introduced at 65 ml/min while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 μm polytetrafluoroethylene coated filter paper (available from Osmonics Inc., Cat #Z50WP04750). The filtrated fractions are dried overnight in a vacuum oven at 60° C. and weighed on an analytical balance before further testing.

TMA

Thermal Mechanical Analysis (Penetration Temperature) (TMA) is conducted on 30 mm diameter×3.3 mm thick, compression molded discs, formed at 180° C. and 10 MPa molding pressure for 5 minutes and then air quenched. The instrument used is a TMA 7, brand available from Perkin-Elmer. In the test, a probe with 1.5 mm radius tip (P/N N519-0416) is applied to the surface of the sample disc with 1N force. The temperature is raised at 5° C./min from 25° C. The probe penetration distance is measured as a function of temperature. The experiment ends when the probe has penetrated 1 mm into the sample.

2. Foam Test Methods

As used herein, the term "air flow" is a measure of the air that is able to pass through the foam under a given applied air pressure. Air flow is measured as the volume of air which passes through a 1.0 inch (2.54 cm) thick×2 inch×2 inch (5.08 cm) square section of foam at 125 Pa (0.018 psi) of pressure. Units are expressed in cubic decimeters per second (i.e. liters per second) and converted to standard cubic feet per minute (scfm). A representative commercial unit for measuring air flow is manufactured by TexTest AG of Zurich, Switzerland and identified as TexTest Fx3300. This measurement follows ASTM D 3574 Test G.

The term "compression force deflection" (or "CFD") is a measure of the force required to compress the foam to a certain strain (i.e., 25%, 65%, or 75%). The term "CFD 25%" refers to a compression force deflection measurement where a foam 4×4 inches in the lateral direction and 2 inches thick (10.16 cm×10.16 cm×5.08 cm) is compressed down in the thickness-axis to a compression strain of 25%, and held for one minute before the compression force deflection measurement is determined, i.e., the foam is compressed to 75%, of its original thickness, according to the procedures of ASTM D 3574, Test C and is measured in pounds force ($lb_f$) or in newtons (N). The terms "CFD 65%" and "CFD 75%" similarly correspond to 35% compression and 25% compression of the original foam thickness, respectively.

The term "90% compression set" is the compression set test measured at the 90% compressive deformation level and parallel to the rise direction in the foam. This test is used to correlate in-service loss of cushion thickness and changes in foam hardness. The Compression Set @ 90% is determined according to the procedures of ASTM D 3574-95, Test I, and is measured as percentage of original thickness of the sample.

Density—Foam density (including free rise density) is determined according to the procedures of ASTM D 1622.

The term "percent elongation" (or % elongation) as applied to a foam is the linear extension which a sample of foam can attain before rupture. The foam is tested by the same method used to determine tensile strength, and the result is expressed as a percentage of the original length of the foam sample according to the procedures of ASTM D-3574, Test E.

The "recovery time" is the time it takes the foam to recover to its original dimensions after compression. Recovery time is measured by releasing/returning the compression load head from the CFD 75% position (foam compression to 25% of original foam thickness) to the position where foam compression is to 90% of original foam thickness. The recovery time is defined as the time from releasing/returning the compression load head to the moment that the foam pushes back against the load head with a force of at least one Newton, and is measured in seconds.

The term "resiliency" refers to the quality of a foam perceived as springiness. Resiliency is measured according to the procedures of ASTM D3574 Test H. A ball rebound test measures the height a dropped steel ball of known weight rebounds from the surface of the foam when dropped under specified conditions and expresses the result as a percentage of the original drop height. The "average resiliency" is an average of 5 separate measurements performed on the same foam specimen.

The term "support factor" is the ratio of 65% Compression Force Deflection (CFD 65%) divided by 25% Compression Force Deflection (CFD 25%).

The term "tear strength" is the maximum average force required to tear a foam sample which is pre-notched with a slit cut lengthwise into the foam sample. The test results are determined according to the procedures of ASTM D3574-F in pounds per linear inch (lbf/in) or in Newtons per meter (N/m).

The term "tensile strength" as applied to a foam is maximum force which a dogbone shaped foam sample can bear while being extended under linear (uniaxial) extensional force. The stress is increased until the material reaches a break point at which time the load and extension at break are used to calculate the tensile strength and the elongation, all determined according to the procedures of ASTM D-3574, Test E and is measured in pounds per square inch (psi) or kilopascals (kPa).

Some embodiments of the present disclosure will now be described in detail in the following Examples.

EXAMPLES

1. Components—Gel Particles

Gel particle components and properties for examples and comparative samples are provided in Table 1 below.

holes on a twin screw extruder. Then, oil is imbibed into the OBC particles by combining the OBC and oil, and allowing the OBC to absorb the oil in an oven at 60° C.

In Example 2, INIFUSE™ 9007, oil, and a color masterbatch are compounded on a twin screw extruder at 145° C. The compound then is then cryoground to the final particle size.

In Example 3, INIFUSE™ 9530 is ground to a fine powder. Then, oil is imbibed into the OBC particles by combining the OBC and oil, and allowing the OBC to absorb the oil in an oven at 80° C.

In Example 4, micropellets of INIFUSE™ 9530 are obtained using a micropelletization die with 0.014" diameter holes on a twin screw extruder. The micropellets then are imbibed with oil by combining the micropellets and oil, then allowing the OBC to absorb the oil in an oven at 60° C.

For all four examples, non-agglomerated OBC/oil gel particles are obtained.

Comparative samples (CS) 1 and 3 are foams with no gel particles dispersed in the foam.

For Comparative sample 2 (CS 2), micropellets of ENGAGE™ 8100 are combined with oil and the mixture is placed in an oven at 60° C. Even though ENGAGE™ 8100 (0.870 g/c) has a similar density to that of INIFUSE™ 9007 (0.866 g/cc), imbibing ENGAGE™ 8100 with oil results in significant agglomeration of the gel particles. It is believed the agglomeration is the result of the lower melting point (60° C.) of ENGAGE™ 8100 versus the higher melting point (119° C.) for INIFUSE™ 9007.

Comparative sample 4 (CS 4) is prepared by imbibing oil into Kraton™ 1651, a SEBS polymer that is produced as a porous powder. The SEBS powder is imbibed with oil by combining the powder and oil, then allowing the SEBS to absorb the oil in an oven at 50° C.

The OBC-based gel particles have a higher softening temperature compared to SEBS-based gel particles. The OBC-based gels handle and process better (no agglomeration) than the SEBS gel particles.

TABLE 1

| Sample | Structure | Density (g/cc) | MI | mol % octene In SS | wt % soft segment |
|---|---|---|---|---|---|
| INFUSE ™ 9007 (OBC) | ethylene-octene multi-block copolymer | 0.866 | 0.5 | 18.0 | 89 |
| INFUSE ™ 9530 (OBC) | ethylene-octene multi-block copolymer | 0.887 | 5.0 | 18.0 | 67 |
| ENGAGE ™ 8100 | ethylene/octene random copolymer | 0.870 | 1.0 | — | — |
| Kraton G1651 H (SEBS) | poly(styrene-(ethylene-co-butylene)-styrene) | 0.912 | <1 | — | <1% diblock |
| Paralux ™ 6001 | Paraffinic oil | | | | |
| Hydrobrite ™ 550 | White mineral oil | | | | |

SEBS = poly(styrene-(ethylene-co-butylene)-styrene)
SS = soft segment

2. Production of Gel Particles

Four different methods are used to prepare gel particles.

In Example 1, micropellets of INIFUSE™ 9007 are obtained using a micropelletization die with 0.020" diameter Properties of the gel particles are provided in Table 2 below. Weight percent values based on total weight of the gel particles.

TABLE 2

Gel Particles Formulations and Properties

|  |  | Example 1 | Example 2 | Example 3 | Example 4 | CS 1 (foam only) | CS 2 | CS 3 (foam only) | CS 4 |
|---|---|---|---|---|---|---|---|---|---|
| Elastomer, wt % | INFUSE ™ 9007 | 50 | 45 | — | — | — | — | — | — |
|  | INFUSE ™ 9530 | — | — | 50 | 70 | — | — | — | — |
|  | ENGAGE ™ 8100 | — | — | — | — | — | 60 | — | — |
|  | Kraton ™ 1651 | — | — | — | — | — | — | — | 40 |
|  | Elastomer Form | 800 μm micropellets | TSE compound, then cryoground | Ground powder (300 μm) | 600 μm micropellets | None | 800 μm micropellets | None | Porous powder (50-1200 μm) |
| Oil, wt % | Hydrobrite ™ 550 | 49.9 | 52 | 49.9 | 69.9 | — | 39.9 | — | 59.9 |
| Dye | LDPE color MB | — | 3 | — | — | — | — | — | — |
|  | Orcosolv Blue | 0.12 | — | — | 0.12 | — | 0.12 | — | — |
|  | Solvent Red 111 | — | — | 0.1 | — | — | — | — | 0.1 |
|  | Oil Imbibe Temperature (° C.) | 60 | TSE | 80 | 60 | — | 60 | — | 50 |
| Properties | Gel particle size (μm) | ~1000 | ~500 | ~500 | ~800 | — | ~1000 | — | 100-1500 |
|  | Melting Temperature (° C.) | ~120 | ~120 | ~120 | ~120 | — | ~50 | — | NA (amorphous) |

TSE = twin screw extruder

3. Production of VE Polyurethane Foam with Gel Particles Dispersed Therein

The foam composition comprises polyols, isocyanate, a blowing agent (water), catalysts, surfactant, and in some cases, gel particles.

The following components are used to make the comparative samples and the examples.

VORANOL™ WK 3140 Polyol, VORANOL™ 3136 Polyol, VORANOL™ 3150 Polyol, VORANOL™ 2070 Polyol, and PAPI™ PB 219 Isocyanate are available from The Dow Chemical Company.

Niax® L-618 silicone surfactant is obtained from Momentive Performance Materials. KOSMOS® 10-P tin octoate catalyst (diluted down to 33.3% with 66.7% mineral oil) is obtained from Evonik. DABCO® BL-11 and DABCO® 33-LV catalysts are obtained from Air Products and Chemicals.

Orcosolve® Blue AP (powder dye, blue color) from Organic Dyestuffs Corporation ("ORCO") is used as received in the mineral oil to color the gel particles blue.

The samples are made through box foaming using a 38 cm×38 cm×24 cm (or about 15"×15"×9.5") wooden box lined with thin plastic film lining. A high shear mixer (4 pins in each of the four radially extending directions) at high rotation speed is used to mix components in a 1-gallon container. Formulation total mass is 1.8-2.2 kg for viscoelastic polyurethane foam formulations at 2 parts per hundred parts (pphp) water. The components in the formulation with the exception of the tin catalyst (KOSMOS® 10-P) and PAPI™ PB 219 isocyanate are mixed first for 15 seconds (2400 rpm)—if gel particles is used, they are added in this first step. Then the stannous octoate catalyst (KOSMOS® 10-P) is added and immediately mixed for another 15 seconds (2400 rpm). Finally the PAPI™ PB 219 isocyanate is added to the mixture and immediately mixed for another 4 seconds (2900 rpm). Then the entire mixture is poured into the box lined with plastic film. The blow off time is measured from the moment the final mixing step (the one with the addition of isocyanate) starts. Once foaming is complete, the foam is further allowed to cure overnight under the hood. Skin layers of the foams are discarded and the remainders of the samples are used for characterization.

The composition and properties for the foam/gel particle composites are provided in Table 3 below.

TABLE 3

Compositions - Formulations and Properties

| Composition-foam and gel particles | Parts/gms CS 3 | Parts/gms CS 4 | Parts/gms CS1 | Parts/gms Ex. 4 | Parts/gms Ex. 1 |
|---|---|---|---|---|---|
| Total grams | 2150 | 2500 | 1950 | 2150 | 2150 |
| VORANOL ™ 3150 Polyol | 15/210.9 | 15/206.8 | | | |
| VORANOL ™ WK 3140 Polyol | 60/843.4 | 60/827.1 | 60/758.0 | 60/739.9 | 60/739.9 |
| VORANOL ™ 3136 Polyol | 25/351.4 | 25/344.6 | 15/189.5 | 15/185.0 | 15/185.0 |
| VORANOL ™ 2070 Polyol | | | 25/315.8 | 25/308.3 | 25/308.3 |

TABLE 3-continued

Compositions - Formulations and Properties

| Composition-foam and gel particles | Parts/gms CS 3 | Parts/gms CS 4 | Parts/gms CS1 | Parts/gms Ex. 4 | Parts/gms Ex. 1 |
|---|---|---|---|---|---|
| Deionized water | 2.00/28.11 | 2.00/27.57 | 2.00/25.27 | 2.00/24.66 | 2.00/24.66 |
| Kraton ™ 1651 w/ 60% mineral oil | | 28/386.0 | | | |
| INFUSE ™ 9530/mineral oil - 70/30 wt % | | | | 20/246.6 | |
| INFUSE ™ 9007/mineral oil - 50/50 wt % | | | | | 20/246.6 |
| Niax ® L-618 surfactant | 0.8/11.25 | 1.2/16.54 | 0.8/10.11 | 0.8/9.87 | 0.8/9.87 |
| DABCO ® BL-11 catalyst | 0.15/2.109 | 0.15/2.068 | 0.2/2.527 | 0.2/2.466 | 0.2/2.466 |
| DABCO ® 33-LV catalyst | 0.05/0.703 | 0.05/0.689 | 0.05/1.895 | 0.05/1.850 | 0.05/1.850 |
| KOSMOS ® 10-P catalyst | 0.15/2.109 | 0.15/2.068 | 0.15/1.895 | 0.15/1.850 | 0.15/1.850 |
| PAPI ™ PB 219 Isocyanate | 49.80/700.0 | 49.80/685.5 | 51.15/646.2 | 51.15/630.7 | 51.15/630.7 |
| Properties | | | | | |
| CFD @ 25% (lbf) | 2.2 | 1.5 | 2.1 | 1.8 | 1.8 |
| CFD @ 65% (lbf) | 5.1 | 4.8 | 3.7 | 3.8 | 3.7 |
| CFD @ 75% (lbf) | 8.6 | 9.4 | 5.9 | 6.6 | 6.2 |
| Support Factor | 2.26 | 3.14 | 1.83 | 2.11 | 2.04 |
| Recovery Time (Sec) | 4 | 3 | 2 | 2 | 2 |
| Air Flow (scfm) | 2.1 | 1.5 | 4.6 | 3.2 | 3.2 |
| Average Resiliency (%) | 3.6 | 4 | 2.6 | 2.6 | 2.4 |
| Tear Strength (pli) | 1.38 | 1.17 | 0.88 | 0.84 | 0.97 |
| Tensile Strength (psi) | 14.0 | 12.4 | 6.1 | 6.1 | 6.5 |
| % Elongation | 112 | 112 | 107 | 115 | 116 |
| Free Rise Density (pcf) | 3.37 | 4.31 | 3.23 | 3.84 | 3.63 |
| 90% Compression Set (CT) | 1.2 | 9.0 | 1.1 | 1.1 | 1.3 | scfm = standard cubic feet per minute
pcf = pounds per cubic foot
pli = pounds per linear inch
psi = pounds per square inch 4. Results CS 1 and CS 3 are baseline foams and contain no gel particles. Foam compositions with the gel particles from examples 2 and 3 (from Table 2) are not produced. Examples 2 and 3 (Table 2) are provided to show other methods for producing gel particles.

No foam composition is prepared for CS 2 because the gel particles of CS 2 (ENGAGE™ 8100) agglomerated.

CS 1 is the baseline foam for Example 1 and Example 4. CS 3 is the baseline foam for CS 4. The CS 4 with SEBS-based gel particles leads to an increase in the support factor. The increase in compression set by 8 percentage points for CS 4 over CS 3 is due to sensitivity of the particular PU foam formulation. Specifically, the presence of gel particles in CS 4 requires greater amounts of the polyisocyanate (in this case PAPI™ PB 219) in order to provide a polymer network that exhibits low compression set.

Example 1 and Example 4 (OBC-based gel particles) each show an increase in the support factor when compared to CS 1. The CFD at 65% for Example 1 and Example 4 is similar to the CFD at 65% for CS 1. However, CFD at 25% is lower for Example 1 and Example 4 compared to CFD at 25% for CS 1. Thus, a mattress containing Example 1 or Example 4 feels softer than a mattress containing CS 1 at low compression (25%). Surprisingly, a mattress with Example 1 or Example 4 provides the same level of support as a mattress with CS 1 at higher compression (CFD at 65%). Example 1 and Example 4 provide an improved level of softness combined with support resulting in a foam that feels more comfortable than CS 1. Note that the other properties of the foam are maintained when the OBC-based gel particles are included in the foam formulation.

Advantageously, the OBC-based gel particles improve softness and comfort to a foam (and mattresses in particular) and do not diminish other foam properties. The other foam properties are substantially the same between CS 1 and Example 1/Example 4. Notably, addition of the OBC-based gel particles to the foam does not: (compare CS 1 to Example 1/Example 4)

decrease recovery time
    increase compression set
    decrease tear strength
    decrease tensile strength
    decrease percent elongation
    decrease resiliency

The invention claimed is:

1. A composition comprising:
a foam; and
a plurality of gel particles dispersed in the foam, the gel particles comprising an oil and an ethylene/α-olefin multi-block copolymer with greater than 60 mol % ethylene; and
the ethylene/α-olefin multi-block copolymer comprises hard segments and soft segments, and the soft segments comprise ethylene and greater than 5 weight percent α-olefin comonomer, based on total weight of the soft segment; and
the gel particles have a D50 particle size from 50 microns to 1500 microns.

2. The composition of claim 1 wherein the hard segments comprise greater than 95 weight percent ethylene monomer and less than 5 weight percent α-olefin comonomer, based on the total weight of the hard segments.

3. The composition of claim 2 wherein the ethylene/α-olefin multi-block copolymer consists of ethylene and α-olefin.

4. The composition of claim 1 wherein the ethylene/α-olefin multi-block copolymer is styrene-free.

5. The composition of claim 1 wherein the foam is selected from the group consisting of a polyurethane foam, a latex foam, a polystyrene foam, an epoxy foam, a polyvinyl foam, and combinations thereof.

6. The composition of claim 1 wherein the gel particles comprise from 30 wt % to 70 wt % ethylene/α-olefin multi-block copolymer and from 70 wt % to 30 wt % oil.

7. A composition comprising:
- a foam selected from the group consisting of a polyurethane foam, a latex foam, a polystyrene foam, an epoxy foam, a polyvinyl foam, and combinations thereof; and
- a plurality of gel particles having a D50 particle size from 50 microns to 1500 microns dispersed in the foam, the gel particles comprising an ethylene/α-olefin multi-block copolymer and an oil; and
- the ethylene/α-olefin multi-block copolymer is styrene-free.

8. The composition of claim 7 wherein the ethylene/α-olefin multi-block copolymer comprises hard segments and soft segments, and the soft segments comprise ethylene and greater than 5 weight percent α-olefin comonomer, based on total weight of the soft segment.

9. The composition of claim 8 wherein the hard segments comprise greater than 95 weight percent ethylene monomer and less than 5 weight percent α-olefin comonomer based on the total weight of the hard segments.

10. The composition of claim 9 wherein the ethylene/α-olefin multi-block copolymer comprises greater than 60 mol % ethylene.

* * * * *